US011729632B2

(12) United States Patent
Taherzadeh Boroujeni et al.

(10) Patent No.: US 11,729,632 B2
(45) Date of Patent: Aug. 15, 2023

(54) BEAM REFINEMENT REFERENCE SIGNAL BEFORE PAGING DCI RECEPTION

(71) Applicant: QUALCOMM Incorporated, San Diego, CA (US)

(72) Inventors: Mahmoud Taherzadeh Boroujeni, San Diego, CA (US); Tao Luo, San Diego, CA (US); Iyab Issam Sakhnini, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 17/357,250

(22) Filed: Jun. 24, 2021

(65) Prior Publication Data

US 2021/0409968 A1 Dec. 30, 2021

Related U.S. Application Data

(60) Provisional application No. 63/044,845, filed on Jun. 26, 2020.

(51) Int. Cl.
*H04W 16/28* (2009.01)
*H04W 68/00* (2009.01)
*H04W 76/11* (2018.01)
*H04W 72/044* (2023.01)
*H04W 24/08* (2009.01)
*H04W 72/23* (2023.01)

(52) U.S. Cl.
CPC .......... *H04W 16/28* (2013.01); *H04W 24/08* (2013.01); *H04W 68/005* (2013.01); *H04W 72/046* (2013.01); *H04W 72/23* (2023.01); *H04W 76/11* (2018.02)

(58) Field of Classification Search
CPC ..... H04W 16/28; H04W 76/11; H04W 72/23; H04W 24/08; H04W 68/005; H04W 72/046; H04W 8/26; H04W 41/145; H04W 7/0695; H04W 68/00; H04W 72/04
See application file for complete search history.

(56) References Cited

U.S. PATENT DOCUMENTS

| | | | |
|---|---|---|---|
| 2017/0288763 A1* | 10/2017 | Yoo | H01Q 3/30 |
| 2018/0027594 A1* | 1/2018 | Nagaraja | H04B 7/088 |
| | | | 370/329 |
| 2018/0115958 A1* | 4/2018 | Raghavan | H04B 7/0697 |
| 2018/0132114 A1* | 5/2018 | Sun | H04B 7/088 |
| 2018/0138962 A1* | 5/2018 | Islam | H04B 7/0695 |

FOREIGN PATENT DOCUMENTS

WO   WO-2017099836 A1 *  6/2017

* cited by examiner

*Primary Examiner* — Mewale A Ambaye
(74) *Attorney, Agent, or Firm* — Arent Fox, LLP

(57) ABSTRACT

A base station may transmit a beam refinement reference signal prior to a paging physical downlink control channel (PDCCH) monitoring occasion to improve reception of a paging downlink control information (DCI). A user equipment (UE) may receive at least one transmission indicating the beam refinement reference signal transmitted prior to the PDCCH monitoring occasion. The UE may receive the beam refinement reference signal prior to the paging PDCCH monitoring occasion based on the at least one transmission. The UE may receive a downlink control information on the paging PDCCH monitoring occasion based on the beam refinement reference signal.

30 Claims, 8 Drawing Sheets

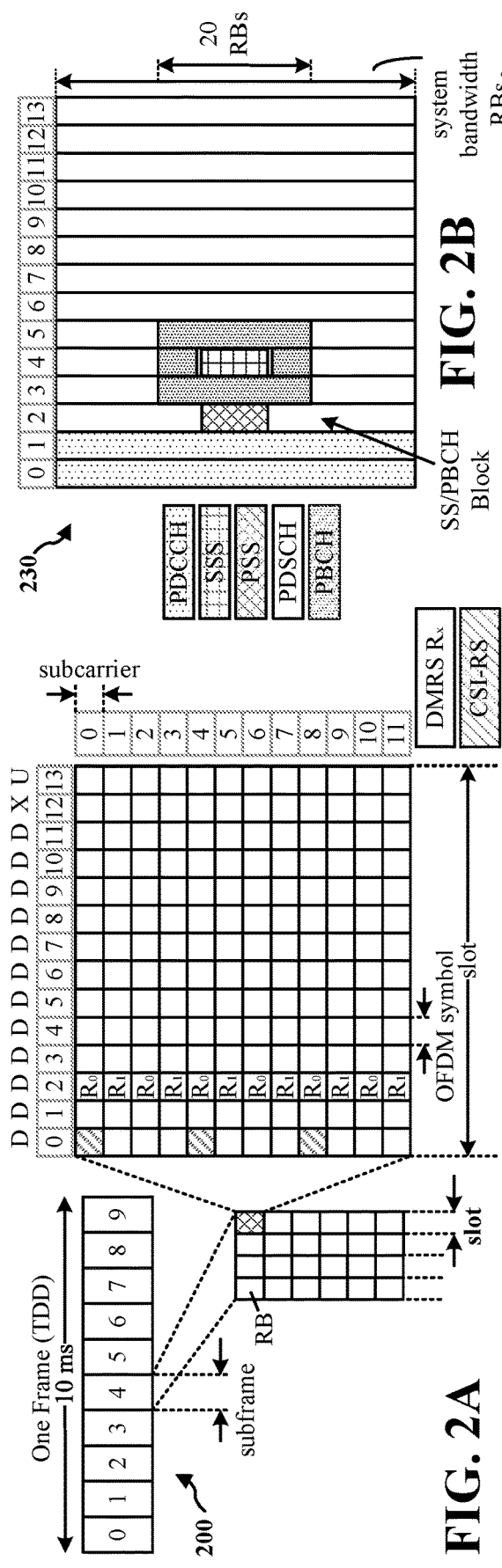
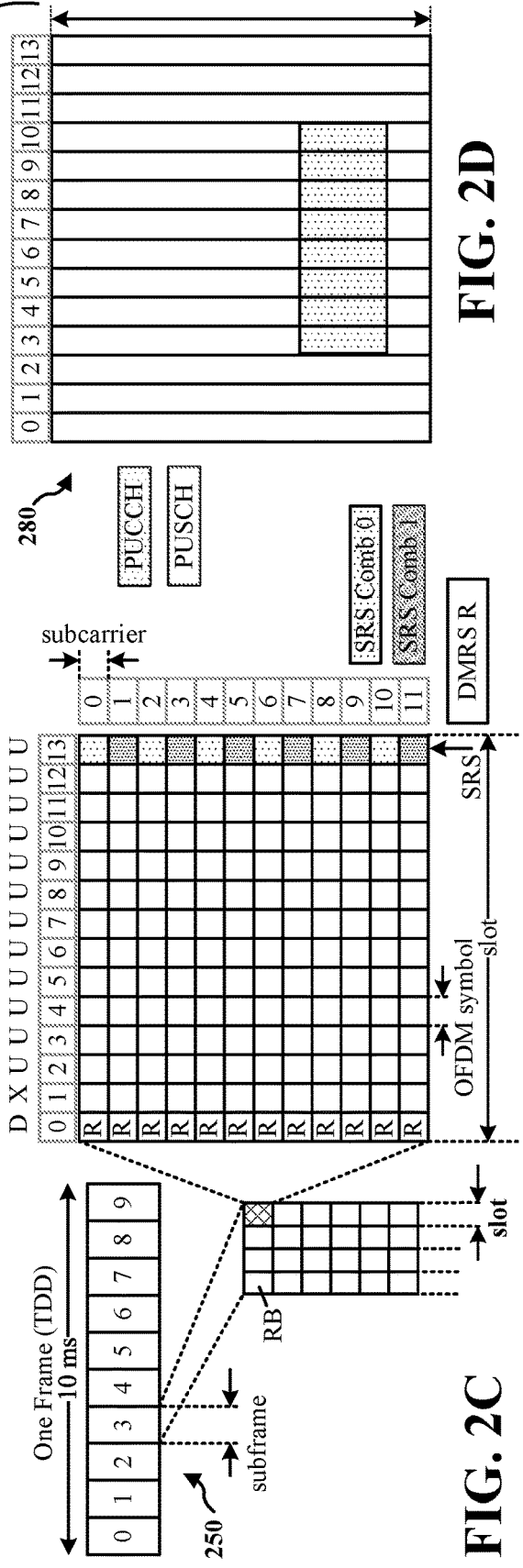
FIG. 2A
FIG. 2B
FIG. 2C
FIG. 2D

BEAM REFINEMENT REFERENCE SIGNAL BEFORE PAGING DCI RECEPTION

CROSS REFERENCE TO RELATED APPLICATIONS

This application claims priority to U.S. Provisional Application Number 63/044,845 titled "BEAM REFINEMENT REFERENCE SIGNAL BEFORE PAGING DCI RECEPTION," filed Jun. 26, 2020, which is assigned to the assignee hereof, and incorporated herein by reference in its entirety.

BACKGROUND

Technical Field

The present disclosure relates generally to communication systems, and more particularly, to a beam refinement reference signal before reception of a paging downlink control information (DCI).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a user equipment (UE). The method may include receiving at least one transmission indicating a beam refinement reference signal transmitted prior to a paging physical downlink control channel (PDCCH) monitoring occasion. The method may include receiving the beam refinement reference signal prior to the paging PDCCH monitoring occasion based on the at least one transmission. The method may include receiving a downlink control information on the paging PDCCH monitoring occasion based on the beam refinement reference signal.

In some implementations, the at least one transmission indicating the beam refinement reference signal is a physical broadcast channel (PBCH) including one or more bit fields indicating presence of the beam refinement reference signal. In some implementations, the one or more bit fields may indicate resources of the beam refinement reference signal.

In some implementations, the at least one transmission is remaining minimum system information (RMSI) or other system information (OSI) indicating resources of the beam refinement reference signal.

In some implementations, the beam refinement reference signal is applicable depending on one or more of: frequency range, frequency band, subcarrier spacing, or paging radio network temporary identifier (P-RNTI).

In some implementations, the method further includes refining a receive beam based on the beam refinement reference signal. For example, refining the receive beam may include selecting a beam from a hierarchical beam structure based on the beam refinement reference signal. As another example, refining the receive beam may include adjusting a weight of a calculated receive beam based on the beam refinement reference signal.

In some implementations, the beam refinement reference signal uses a same sequence as a channel state information reference signal (CSI-RS).

The disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

In an aspect, the disclosure provides a method of wireless communication for a base station. The method may include scheduling transmission of a beam refinement reference signal prior to a paging physical downlink control channel (PDCCH) monitoring occasion. The method may include transmitting the beam refinement reference signal. The method may include transmitting a paging downlink control information (DCI) on the paging PDCCH monitoring occasion subsequent to the beam refinement reference signal.

In some implementations, scheduling transmission of the beam refinement reference signal comprises setting one or more bit fields of a physical broadcast channel (PBCH) to indicate presence of beam refinement reference signal. In some implementations, the one or more bit fields indicate resources of the beam refinement reference signal.

In some implementations, scheduling transmission of the beam refinement reference signal may include including an indication of resources for the beam refinement reference signal in remaining minimum system information (RMSI) or other system information (OSI).

In some implementations, the beam refinement reference signal is applicable depending one or more of: frequency range, frequency band, subcarrier spacing, or paging radio network temporary identifier (P-RNTI).

In some implementations, the beam refinement reference signal uses a same sequence as a channel state information reference signal (CSI-RS).

In some implementations, scheduling the transmission of the beam refinement reference signal prior to the paging PDCCH monitoring occasion includes indicating resources for the beam refinement reference signal relative to the PDCCH monitoring occasion.

The disclosure also provides an apparatus (e.g., a base station) including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with certain aspects of the present description.

FIG. 2B is a diagram illustrating an example of DL channels within a subframe, in accordance with certain aspects of the present description.

FIG. 2C is a diagram illustrating an example of a second frame, in accordance with certain aspects of the present description.

FIG. 2D is a diagram illustrating an example of a subframe, in accordance with certain aspects of the present description.

DETAILED DESCRIPTION

Figure 1:
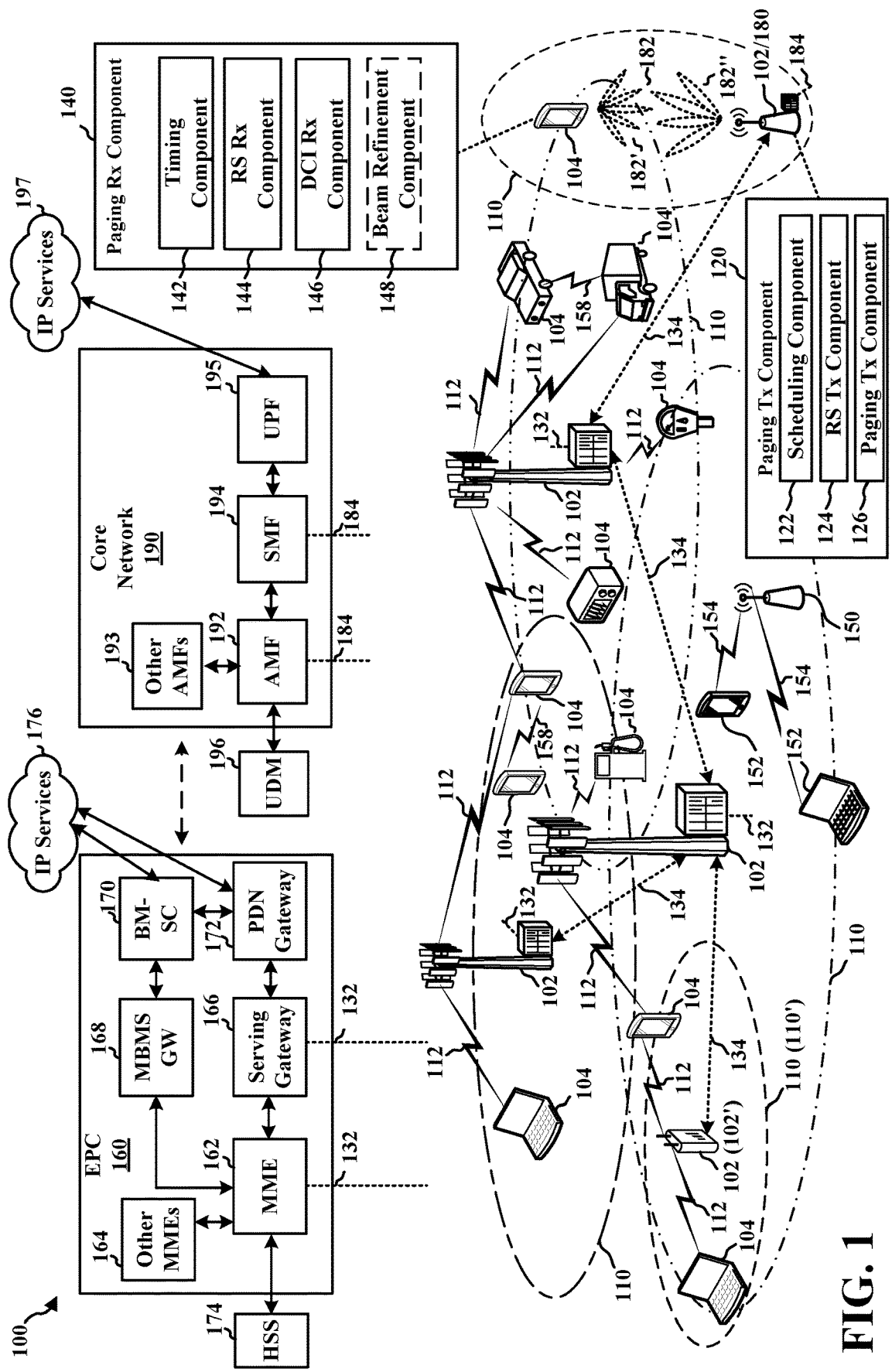
FIG. 1 is a diagram illustrating an example of a wireless communications system and an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In some network deployments, paging may be a bottleneck for coverage. For example, in millimeter-wave 5G, paging may be transmitted as a broadcast channel with a wide broadcast beam. For instance, the beams for the paging may be the same beams used for a synchronization signal block (SSB). Although the broad beams may be received by UEs in different locations, the broad beams may not have the gains associated with beamforming. Accordingly, improvement of coverage of paging may be possible, especially for UEs near a cell edge.

In some network deployments, parameters for paging may be explicitly signaled in the remaining minimum system information (RMSI) and/or other system information (OSI) of the cell. In particular, the RMS/POSI may include a paging occasion configuration including a time offset, a duration, a periodicity, and a physical downlink control channel configuration, which provides a search space configuration including monitoring occasions (e.g., frequency domain resources and aggregation levels) within the paging occasion. A paging control resource set (CORESET) may have the same configuration as a RMSI CORESET, which may be indicated in a physical broadcast channel (PBCH) as part of the SSB.

A paging procedure may include a paging scheduling downlink control information (DCI) and a paging message. The paging scheduling DCI and the paging message may be sent at least in the same slot. UEs may be grouped where a group of UEs may be specifically configured with configured paging occasions per slot for the group of UEs. Short paging messages (i.e., defined messages indicated by several bits of the DCI) may be included in the paging DCI. Examples of short paging messages may include a system information modification message (systemInfoModification), a Commercial Mobile Alert System message (cmas-Indication), and Earthquake and Tsunami Warning System message (etws-Indication).

A UE may assume that SSBs, paging DCIs, and paging messages use the same beams. For example, the UE may assume a quasi-co-location for the SSBs, paging DCIs, and paging messages. The UE may not be required to soft combine multiple paging DCIs within one paging occasion. Generally, beam refinement can improve coverage by increasing the beam gain. Beam refinement can be performed at a transmitter or a receiver. In the case of paging, the transmitter (e.g., a base station) may be unable to refine the broad beams for paging because of the goal of covering multiple UEs in different locations.

In an aspect, the present disclosure provides techniques for a UE to improve reception of paging DCI and paging messages using a beam refinement reference signal that may be received before the paging DCI. The base station may schedule the beam refinement reference signal in one or more transmissions such as the PBCH, RMSI, or OSI. The UE may determine the presence and scheduling of the beam refinement reference signal based on the one or more transmissions. For example, the one or more transmissions may schedule the beam refinement reference signal relative to a paging PDCCH monitoring occasion. The UE may receive the beam refinement reference signal prior to the PDCCH monitoring occasion. The UE may receive the paging DCI on the paging PDCCH monitoring occasion based on the beam refinement reference signal. For example, the UE may refine a receive beam to be used for monitoring the paging PDCCH based on the beam refinement reference signal. Accordingly, the UE may improve coverage of paging PDCCH and paging messages.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, as illustrated, one or more of the base stations 102 may include a paging transmit (Tx) component 120 configured to transmit a beam refinement reference signal prior to transmitting a paging DCI and paging message. The paging Tx component 120 may include a scheduling component 122 configured to schedule transmission of the beam refinement reference signal prior to a paging PDCCH monitoring occasion. The paging Tx component 120 may include a reference signal (RS) Tx component 124 configured to transmit the beam refinement reference signal. The paging Tx component 120 may include a DCI Tx component 126 configured to transmit a DCI on the paging PDCCH monitoring occasion.

In an aspect, as illustrated, one or more of the UEs 104 may include a paging receive (Rx) component 140 that receives a beam refinement reference signal, paging DCI, and paging message. The paging Rx component 140 may include a timing component 142 configured to receive at least one transmission indicating a beam refinement reference signal transmitted prior to a paging physical downlink control channel (PDCCH) monitoring occasion. The paging Rx component 140 may include a RS Rx component 144 configured to receive the beam refinement reference signal prior to the paging PDCCH monitoring occasion. The paging Rx component 140 may include a DCI Rx component 146 configured to receive a DCI on the paging PDCCH monitoring occasion based on the beam refinement reference signal. In some implementations, the paging Rx component 140 may include a beam refinement component 148 configured to refine a receive beam based on the beam refinement reference signal.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management.

All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
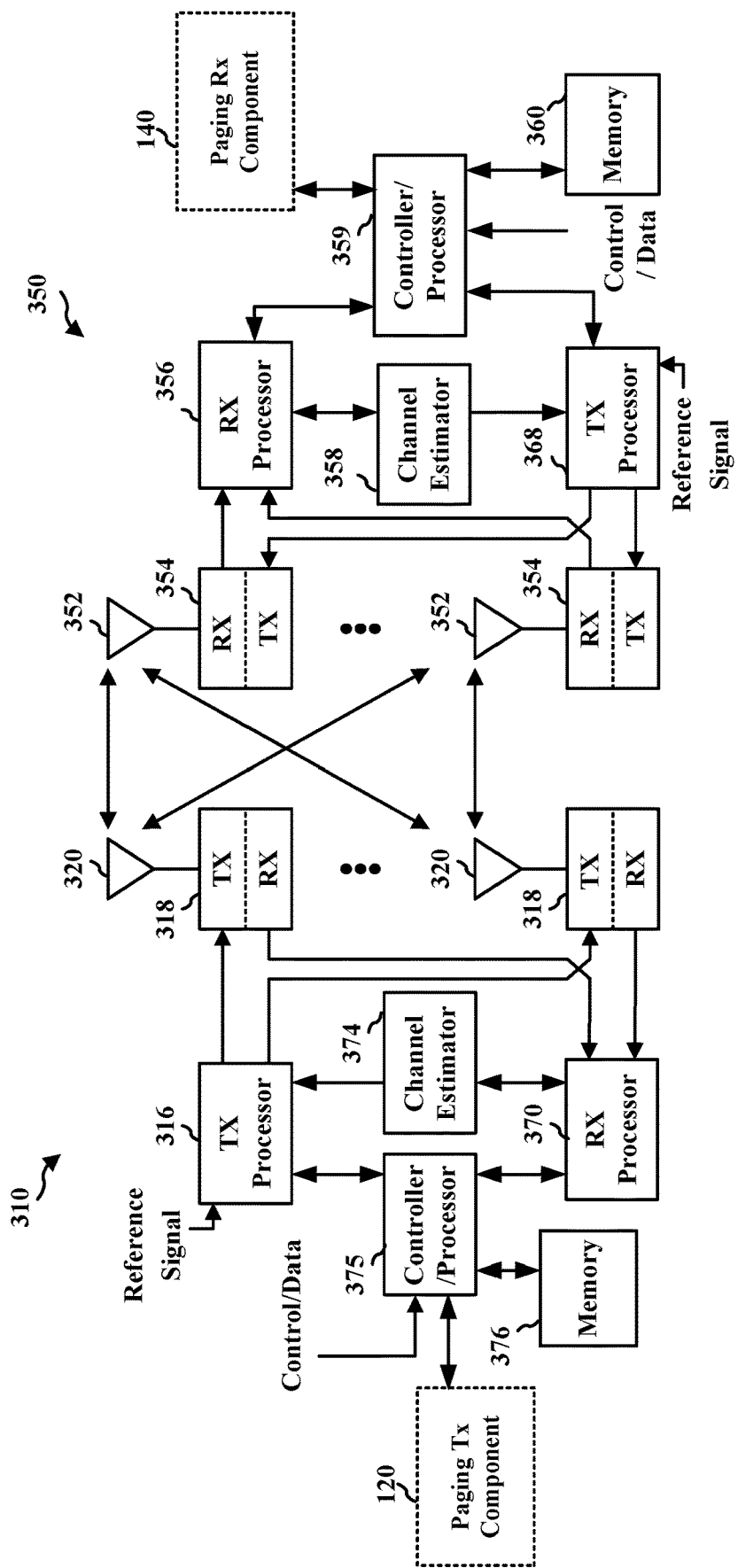
FIG. 3 is a diagram illustrating an example of a base station and user equipment (UE) in an access network, in accordance with certain aspects of the present description.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the paging Rx component 140 of FIG. 1.

At least one of the TX processor 316, the RX processor 370, and the controller/processor 375 may be configured to perform aspects in connection with the paging Tx component 120 of FIG. 1.

Figure 4:
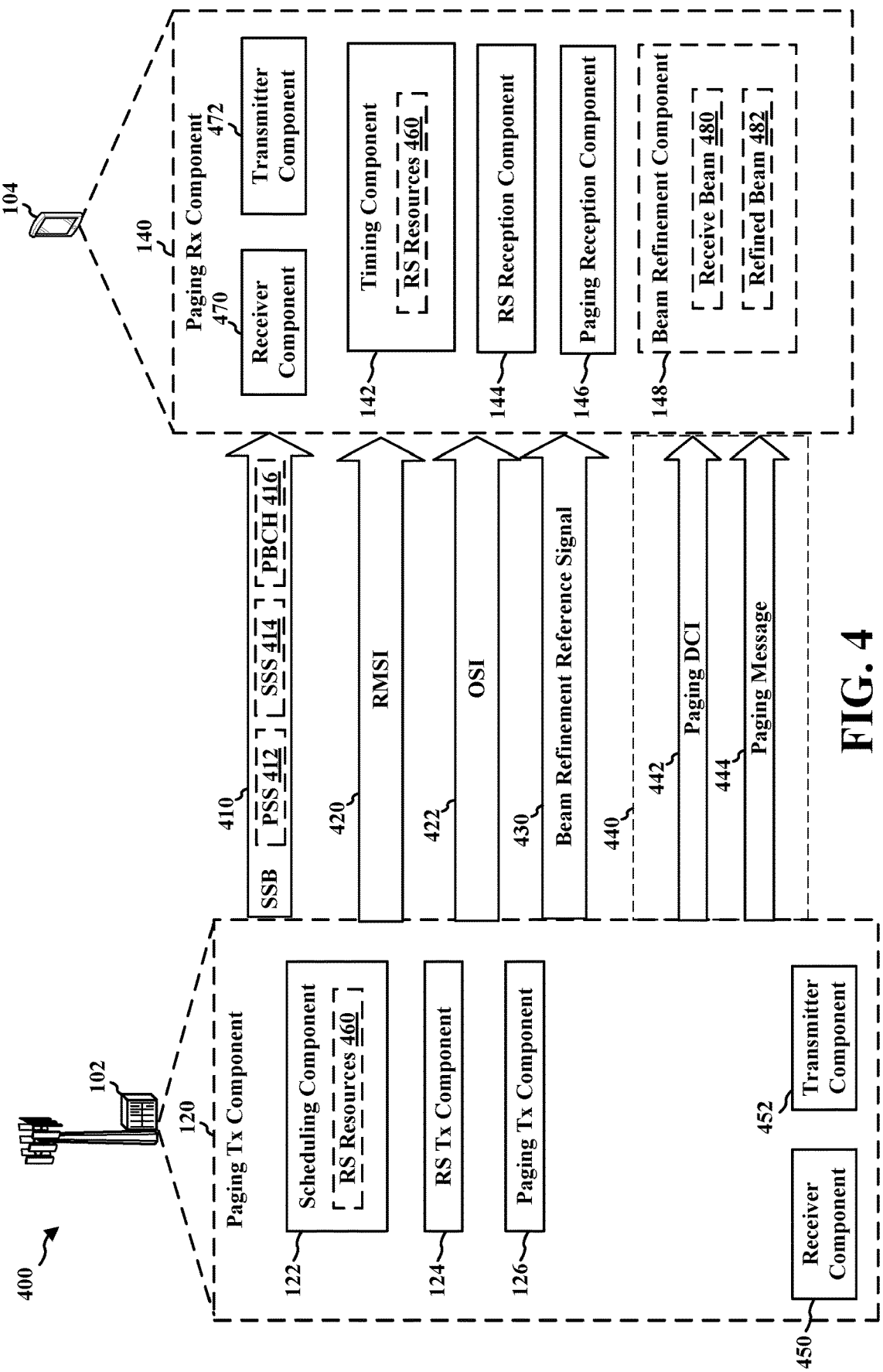
FIG. 4 is a diagram illustrating example communications and components of a base station and a UE, in accordance with certain aspects of the present description.

FIG. 4 is a diagram 400 illustrating example communications and components of a base station 102 and a UE 104. The UE 104 may include the paging Rx component 140. The base station 102 may include the paging Tx component 120.

As discussed above regarding FIG. 1, paging Rx component 140 may include the timing component 142, the RS Rx component 144, and the DCI Rx component 146. The paging Rx component 140 may optionally include the beam refinement component 148. The paging Rx component 140 may also include a receiver component 470 and a transmitter component 472. The receiver component 470 may include, for example, a radio-frequency (RF) receiver for receiving the signals described herein. The transmitter component 472 may include for example, an RF transmitter for transmitting the signals described herein. In an aspect, the receiver component 470 and the transmitter component 472 may be co-located in a transceiver.

The paging Tx component 120 may include the scheduling component 122, the RS Tx component 124, and the paging Tx component 126. The paging Tx component 120 may also include a receiver component 450 and a transmitter component 452. The receiver component 450 may include, for example, a RF receiver for receiving the signals described herein. The transmitter component 452 may include for example, an RF transmitter for transmitting the signals described herein. In an aspect, the receiver component 450 and the transmitter component 452 may be co-located in a transceiver.

The base station 102 and/or the paging Tx component 120 may transmit a SSB 410. The SSB 410 may include a physical synchronization signal (PSS) 412, secondary synchronization signal (SSS) 414, and physical broadcast channel (PBCH) 416. The PBCH 416 may include a master information block (MIB) defining a CORESET. In some implementations, the scheduling component 122 may include an indication and/or scheduling of a beam refinement reference signal 430 in the PBCH 416. For example, one or more bit fields of the PBCH 416 (e.g., bit fields for the configuration of CORESET0) may have an alternative interpretation for UEs capable of receiving the beam refinement reference signal 430. For example, the one or more bit fields may be associated with a configuration table for PDCCH monitoring occasions for Type0-PDCCH common search space. For example 3GPP TS 38.213 v. 16.0 includes tables 13.11-13.14 that define PDCCH monitoring occasions including paging PDCCH monitoring occasions 440. One or more of these tables may be expanded to include a column indicating whether a beam refinement reference signal 430 is transmitted prior to the defined paging PDCCH monitoring occasion 440. In some implementations, the table may define reference signal (RS) resources 460 for the beam refinement reference signal 430. For example, the RS resources 460 may be defined with respect to resources for the paging PDCCH monitoring occasion 440. The resources and parameters of the beam refinement reference signal 430 may be dependent on the parameters of the Type0-PDCCH common search space with additional details (e.g., a time and/or frequency offset) based on a separate table or RMSI/OSI configuration.

In some implementations, the base station 102 and/or the paging Tx component 120 may transmit the RMSI 420 and the OSI 422. For example, the paging Tx component 120 may transmit a DCI on the CORESET0 indicating the RMSI 420 or the OSI 422. The UE 104 may detect the DCI and receive the RMSI 420 or the OSI 422. Either the RMSI 420 or the OSI 422 may include scheduling information (e.g., RS resources 460) for the beam refinement reference signal 430.

In some implementations, the scheduling of the beam refinement reference signal 430 may be applicable depending on one or more of the following parameters: frequency range, frequency band, subcarrier spacing, or paging radio network temporary identifier (P-RNTI). For example, one or more of the tables defining the PDCCH monitoring occasions based on frequency range and subcarrier spacing may include the column indicating whether beam refinement reference signal 430 is transmitted, while another table for frequency range and subcarrier spacing may not provide an indication of the beam refinement reference signal 430. For instance, the beam refinement reference signal may not be needed for FR1 and a table for FR1 may not include the column indicating whether beam refinement reference signal 430 is transmitted. As another example, a separate P-RNTI may be associated with UEs having a capability to receive the beam refinement reference signal. The separate P-RNTI may be used to signal the beam refinement reference signal 430 scheduling.

The base station 102 and/or the paging Tx component 120 may define a paging search space configuration including paging PDCCH monitoring occasions 440. Within the paging PDCCH monitoring occasions 440, the base station 102 and/or the paging Tx component 120 may transmit a paging DCI 442 and paging message 444. Before the paging PDCCH monitoring occasions 440, the base station 102 and/or the paging Tx component 120 may transmit the beam refinement reference signal 430. For example, the RS Tx component 124 may transmit the beam refinement reference signal 430 according to the transmitted scheduling. In some implementations, the beam refinement reference signal 430 may be a defined sequence of bits. For example, the beam refinement reference signal 430 may have the same sequence as a channel state information reference signal (CSI-RS). Unlike the CSI-RS, a UE 104 may not use the beam refinement reference signal 430 for measurement reporting.

The UE 104 and/or the paging Rx component 140 may receive the paging DCI 442 based on the beam refinement reference signal 430. For example, the UE 104 may use the beam refinement reference signal 430 to improve reception of the paging DCI 442. For instance, the paging Rx component 140 may perform channel estimates based on the beam refinement reference signal 430. As another example, the beam refinement component 148 may refine a receive beam 480 based on the beam refinement reference signal 430. For instance, the receive beam 480 for the paging DCI 442 may generally be based on the SSB 410. In some implementations, where receive beams have a hierarchical structure, the beam refinement reference signal 430 may select a refined beam 482 from the hierarchical beam structure based on the beam refinement reference signal 430. In some implementations, the beam refinement reference signal 430 may adjust a weight of a calculated receive beam (e.g., receive beam 480) based on the beam refinement reference signal 430.

Figure 5:
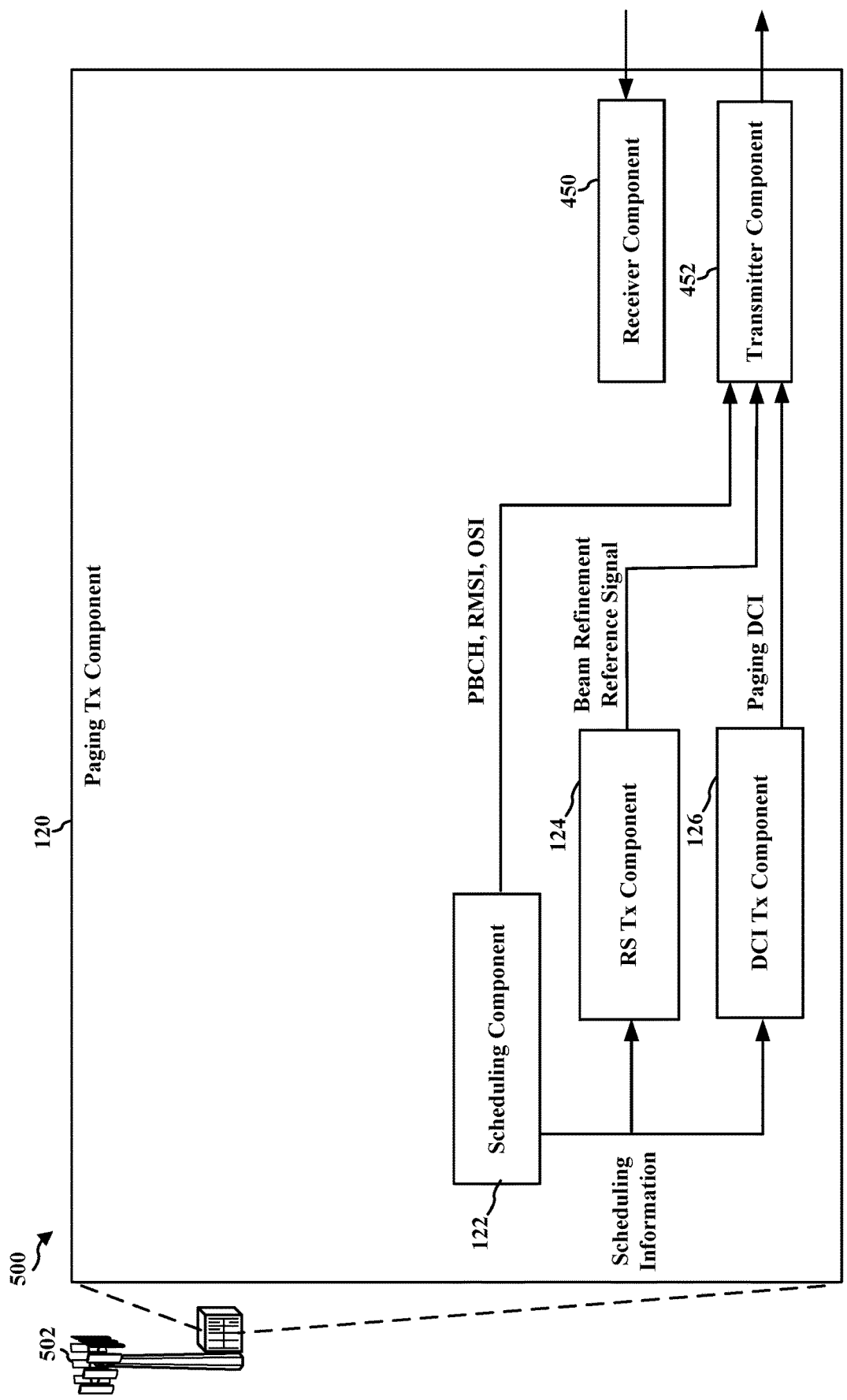
FIG. 5 is a conceptual data flow diagram illustrating the data flow between different means/components in an example UE, in accordance with certain aspects of the present description.

FIG. 5 is a conceptual data flow diagram 500 illustrating the data flow between different means/components in an example base station 502, which may be an example of the base station 102 including the paging Tx component 120.

The scheduling component 122 may generate the PBCH 416, the RMSI 420, and the OSI 422. As discussed above, one or more of the PBCH 416, the RMSI 420, or the OSI 422 may include scheduling information for the beam refinement reference signal 430. The scheduling component 122 may transmit the PBCH 416, the RMSI 420, and the OSI 422 via the transmitter component 452. The scheduling component 122 may also provide the scheduling information to the RS Tx component 124 and the DCI Tx component 126.

The RS Tx component 124 may receive the scheduling information from the scheduling component 122. The scheduling information may include the time domain and frequency domain resources for the beam refinement reference signal 430. The RS Tx component 124 may transmit the beam refinement reference signal 430 on the scheduled resources via the transmitter component 452.

The DCI Tx component 126 may receive the scheduling information from the scheduling component 122. For example, the scheduling information may include the paging PDCCH monitoring occasion 440. The DCI Tx component 126 may transmit a paging DCI 442 during the paging PDCCH monitoring occasion 440 via the transmitter component 452.

The receiver component 450 may receive uplink signals from the UE 104, for example, in response to the paging message 444.

Figure 6:
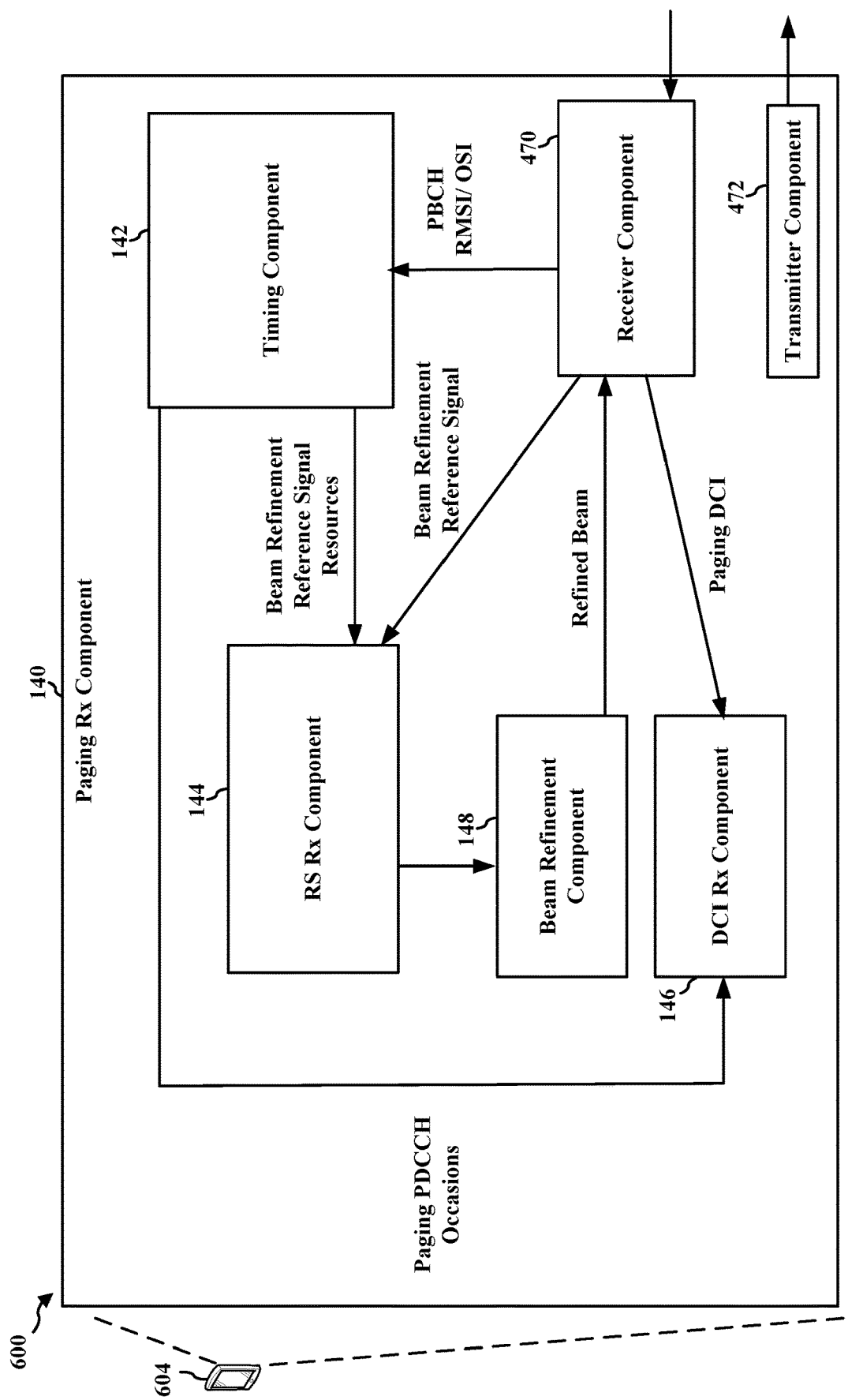
FIG. 6 is a conceptual data flow diagram illustrating the data flow between different means/components in an example base station, in accordance with certain aspects of the present description.

FIG. 6 is a conceptual data flow diagram 600 illustrating the data flow between different means/components in an example UE 604, which may be an example of the UE 104 and include the paging Rx component 140.

The receiver component 470 may receive various broadcast and downlink signals. For example, the receiver component 470 may receive the PBCH 416, the RMSI 420, the OSI 422, the beam refinement reference signal 430, and the paging DCI 442. The receiver component 470 may provide the PBCH 416, the RMSI 420, and the OSI 422 to the timing component 142. The receiver component 470 may provide the beam refinement reference signal 430 to the RS Rx component 144. The receiver component 470 may provide the paging DCI 442 to the DCI Rx component 146. In some implementations, the receiver component 470 may receive a refined beam from the beam refinement component 148 to use for receiving the paging DCI 442.

The timing component 142 may receive the PBCH 416, the RMSI 420, and the OSI 422 from the receiver component 470. The timing component 142 may extract scheduling information from the PBCH 416, the RMSI 420, or the OSI 422. In particular, the timing component 142 may extract an indication of resources for the beam refinement reference signal 430 from the PBCH 416, the RMSI 420, or the OSI 422. The timing component 142 may extract the paging PDCCH monitoring occasion 440 from the PBCH 416. The timing component 142 may provide the resources for the beam refinement reference signal 430 to the RS Rx component 144. The timing component 142 may provide the paging PDCCH monitoring occasion 440 to the DCI Rx component 146.

The RS Rx component 144 may receive the resources for the beam refinement reference signal 430 from the timing component 142. The RS Rx component 144 may configure the receiver component 470 to receive the beam refinement reference signal 430 on the resources. The RS Rx component 144 may receive the beam refinement reference signal 430 from the receiver component 470. The RS Rx component 144 may measure the beam refinement reference signal 430. For example, the RS Rx component 144 may determine a path loss, phase noise, channel estimate, or other characteristic of the beam refinement reference signal 430. In some implementations, the RS Rx component 144 provides the beam refinement reference signal 430 or measurements thereof to the beam refinement component 148.

The beam refinement component 148 may receive the beam refinement reference signal 430 or measurements thereof from the RS Rx component 144. The beam refinement component 148 may refine a receive beam based on the beam refinement reference signal 430. The receive beam may be based on the SSB 410. The beam refinement component 148 may select a refined sub-beam of the receive beam based on the beam refinement reference signal 430. The beam refinement component 148 may adjust an antenna weight for the receive beam based on the beam refinement reference signal 430.

Figure 7:
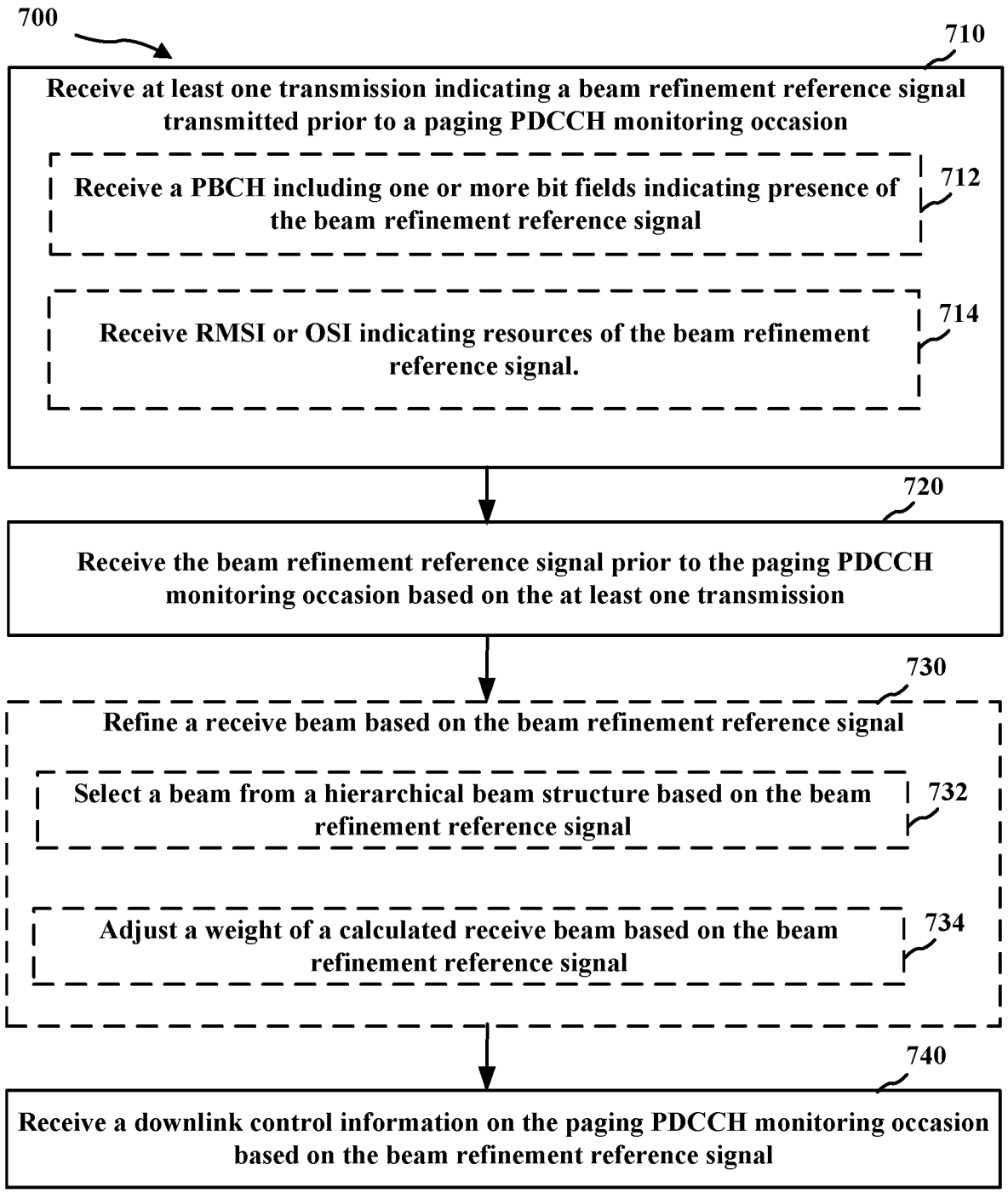
FIG. 7 is a flowchart of an example of a method of wireless communication for a UE, in accordance with certain aspects of the present description.

FIG. 7 is a flowchart of an example method 700 for receiving a paging DCI based on a beam refinement reference signal. The method 700 may be performed by a UE (such as the UE 104, which may include the memory 360 and which may be the entire UE 104 or a component of the UE 104 such as the paging Rx component 140, TX processor 368, the RX processor 356, or the controller/processor 359). The method 700 may be performed by the paging Rx component 140 in communication with the paging Tx component 120 of the base station 102. Optional blocks are shown with dashed lines.

At block 710, the method 700 may include receiving at least one transmission indicating a beam refinement reference signal transmitted prior to a paging PDCCH monitoring occasion. In an aspect, for example, the UE 104, the RX processor 356 and/or the controller/processor 359 may execute the paging Rx component 140 and/or the timing component 142 to receive the at least one transmission indicating the beam refinement reference signal 430 transmitted prior to the paging PDCCH monitoring occasion 440. For example, in sub-block 712, the timing component 142 may receive a PBCH 416 including one or more bit fields indicating presence of the beam refinement reference signal 430. In some implementations, the one or more bit fields of the PBCH 416 indicate resources of the beam refinement reference signal 430. As another example, in sub-block 714, the timing component 142 may receive RMSI 420 or OSI 422 indicating resources of the beam refinement reference signal 430. Accordingly, the UE 104, the RX processor 356, and/or the controller/processor 359 executing the paging Rx component 140 and/or the timing component 142 may provide means for receiving at least one transmission indicating a beam refinement reference signal transmitted prior to a paging PDCCH monitoring occasion.

At block 720, the method 700 may include receiving the beam refinement reference signal prior to the paging PDCCH monitoring occasion based on the at least one transmission. In an aspect, for example, the UE 104, the RX processor 356 and/or the controller/processor 359 may execute the paging Rx component 140 and/or the RS Rx component 144 to receive the beam refinement reference signal 430 prior to the paging PDCCH monitoring occasion 440 based on the at least one transmission (e.g., PBCH 416, RMSI 420, or OSI 422). For example, the RS Rx component 144 may receive the beam refinement reference signal 430 on resources indicated by the at least one transmission. In some implementations, the beam refinement reference signal 430 uses a same sequence as a CSI-RS. In some implementations, the beam refinement reference signal is applicable depending on one or more of: frequency range, frequency band, subcarrier spacing, or P-RNTI. The RS Rx component 144 may receive the beam refinement reference signal 430 when applicable. Accordingly, the UE 104, the RX processor 356, and/or the controller/processor 359 executing the paging Rx component 140 and/or the timing component 142 may provide means for receiving the beam refinement reference signal prior to the paging PDCCH monitoring occasion based on the at least one transmission.

At block 730, the method 700 may optionally include refining a receive beam based on the beam refinement reference signal. In an aspect, for example, the UE 104, the RX processor 356 and/or the controller/processor 359 may execute the paging Rx component 140 and/or the beam refinement component 148 to refine the receive beam based on the beam refinement reference signal 430. For example, at sub-block 732, the beam refinement component 148 may select a beam from a hierarchical beam structure based on the beam refinement reference signal. As another example, at sub-block 734, the beam refinement component 148 may adjust a weight of a calculated receive beam based on the beam refinement reference signal. Accordingly, the UE 104, the RX processor 356, and/or the controller/processor 359 executing the paging Rx component 140 and/or the beam refinement component 148 may provide means for refining a receive beam based on the beam refinement reference signal.

At block 740, the method 700 may include receiving a downlink control information on the paging PDCCH monitoring occasion based on the beam refinement reference signal. In an aspect, for example, the UE 104, the RX processor 356 and/or the controller/processor 359 may execute the paging Rx component 140 and/or the DCI Rx component 146 to receive the paging DCI 442 on the paging PDCCH monitoring occasion 440 based on the beam refinement reference signal 430. Accordingly, the UE 104, the RX processor 356, and/or the controller/processor 359 executing the paging Rx component 140 and/or the timing component 142 may provide means for receiving a downlink control information on the paging PDCCH monitoring occasion based on the beam refinement reference signal.

Figure 8:
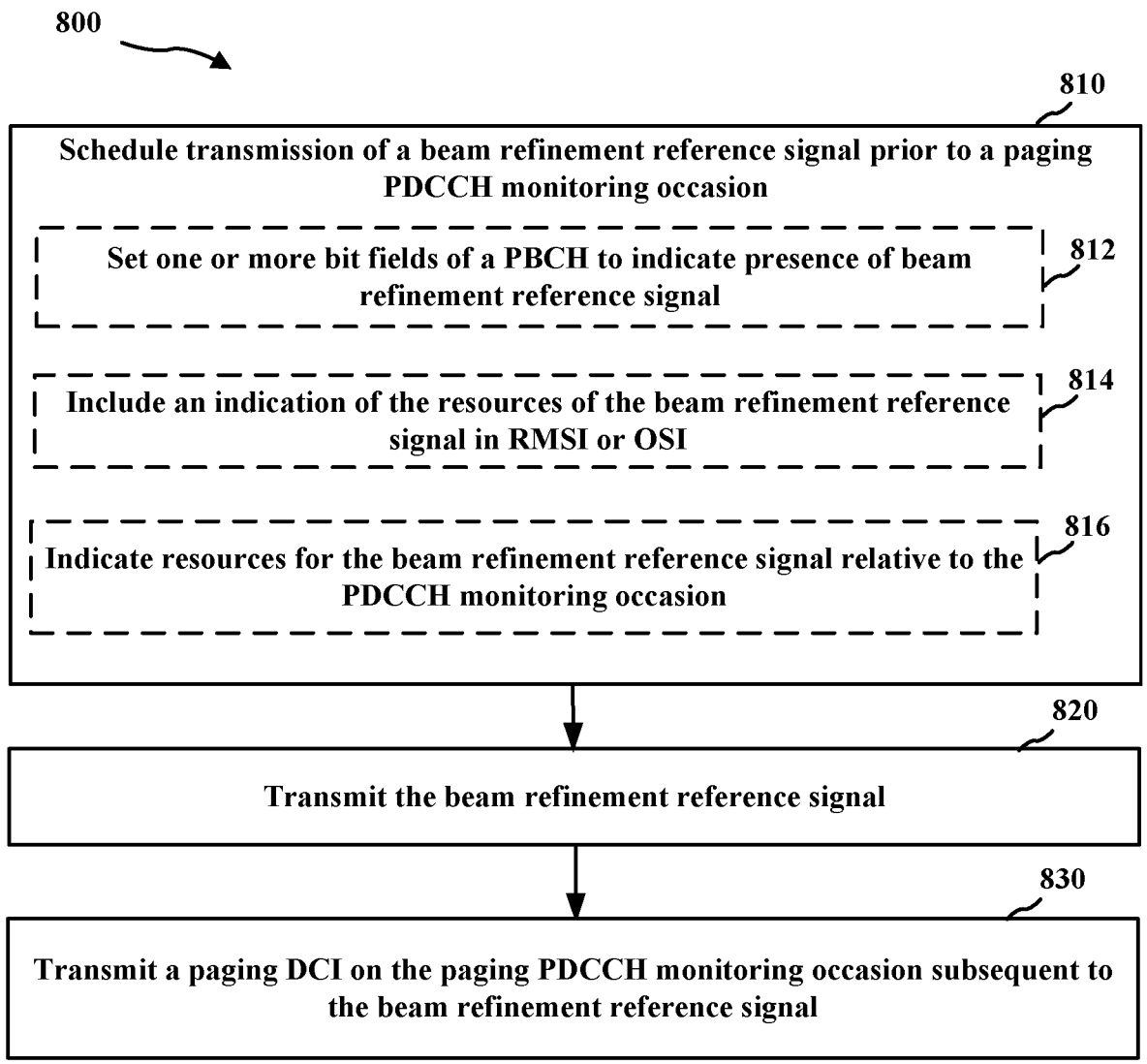
FIG. 8 is a flowchart of an example of a method of wireless communication for a base station, in accordance with certain aspects of the present description.

FIG. 8 is a flowchart of an example method 800 for transmitting a beam refinement reference signal prior to a paging PDCCH monitoring occasion. The method 800 may be performed by a base station (such as the base station 102, which may include the memory 376 and which may be the entire base station 102 or a component of the base station 102 such as the paging Tx component 120, TX processor 316, the RX processor 370, or the controller/processor 375). The method 800 may be performed by the paging Tx component 120 in communication with the paging Rx component 140 of the UE 104. Optional blocks are shown with dashed lines.

At block 810, the method 800 may include scheduling transmission of a beam refinement reference signal prior to a paging PDCCH monitoring occasion. In an aspect, for example, the base station 102, the controller/processor 375, and/or the TX processor 316 may execute the paging Tx component 120 and/or the scheduling component 122 to schedule transmission of the beam refinement reference signal 430 prior to the paging PDCCH monitoring occasion 440. For example, at sub-block 812, the scheduling component 122 may set one or more bit fields of a PBCH 416 to indicate presence of beam refinement reference signal 430. In some implementations, the one or more bit fields indicate resources of the beam refinement reference signal 430. As another example, in sub-block 814, the scheduling component 142 may include an indication of the resources of the beam refinement reference signal in RMSI or OSI. As another example, in sub-block 816, the scheduling component 142 may indicate resources for the beam refinement reference signal relative to the paging PDCCH monitoring occasion 440. Accordingly, the base station 102, the controller/processor 375, and/or the TX processor 316 executing the paging Tx component 120 and/or the scheduling component 122 provide means for scheduling transmission of a beam refinement reference signal prior to a paging PDCCH monitoring occasion.

At block 820, the method 800 may include transmitting the beam refinement reference signal. In an aspect, for example, the base station 102, the controller/processor 375, and/or the TX processor 316 may execute the paging Tx component 120 and/or the RS Tx component 124 to transmit the beam refinement reference signal 430. In some implementations, the beam refinement reference signal uses a same sequence as a CSI-RS. In some implementations, the beam refinement reference signal 430 is applicable depending one or more of: frequency range, frequency band, subcarrier spacing, or P-RNTI. In some implementations, only UEs to which the beam refinement reference signal 430 is applicable are configured to receive the beam refinement reference signal 430. Accordingly, the base station 102, the controller/processor 375, and/or the TX processor 316 executing the paging Tx component 120 and/or the scheduling component 122 may provide means for transmitting the beam refinement reference signal.

At block 830, the method 800 may include transmitting a paging DCI on the paging PDCCH monitoring occasion subsequent to the beam refinement reference signal. In an aspect, for example, the base station 102, the controller/processor 375, and/or the TX processor 316 may execute the paging Tx component 120 and/or the scheduling component 122 to transmit the paging DCI 442 on the paging PDCCH monitoring occasion 440 subsequent to the beam refinement reference signal. Accordingly, the base station 102, the controller/processor 375, and/or the TX processor 316 executing the paging Tx component 120 and/or the scheduling component 122 may provide means for transmitting the paging DCI on the paging PDCCH monitoring occasion subsequent to the beam refinement reference signal.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some Further Example Clauses

Implementation examples are described in the following numbered clauses:

1. A method of wireless communications, comprising, at a UE:
   receiving at least one transmission indicating a beam refinement reference signal transmitted prior to a paging physical downlink control channel (PDCCH) monitoring occasion;
   receiving the beam refinement reference signal prior to the paging PDCCH monitoring occasion based on the at least one transmission; and
   receiving a downlink control information on the paging PDCCH monitoring occasion based on the beam refinement reference signal.
2. The method of clause 1, wherein the at least one transmission indicating the beam refinement reference signal is a physical broadcast channel (PBCH) including one or more bit fields indicating presence of the beam refinement reference signal.
3. The method of clause 2, wherein the one or more bit fields indicate resources of the beam refinement reference signal.
4. The method of clause 1, wherein the at least one transmission is remaining minimum system information (RMSI) or other system information (OSI) indicating resources of the beam refinement reference signal.
5. The method of any of clauses 1-4, wherein the beam refinement reference signal is applicable depending on one or more of: frequency range, frequency band, subcarrier spacing, or paging radio network temporary identifier (P-RNTI).
6. The method of any of clauses 1-5, further comprising refining a receive beam based on the beam refinement reference signal.
7. The method of clause 6, wherein refining the receive beam comprises selecting a beam from a hierarchical beam structure based on the beam refinement reference signal.
8. The method of clause 6, wherein refining the receive beam comprises adjusting a weight of a calculated receive beam based on the beam refinement reference signal.
9. The method of any of clauses 1-8, wherein the beam refinement reference signal uses a same sequence as a channel state information reference signal (CSI-RS).
10. A method of wireless communications, comprising, at a base station:
    scheduling a transmission of a beam refinement reference signal prior to a paging physical downlink control channel (PDCCH) monitoring occasion;
    transmitting the beam refinement reference signal; and
    transmitting a paging downlink control information (DCI) on the paging PDCCH monitoring occasion subsequent to the beam refinement reference signal.
11. The method of clause 10, wherein scheduling the transmission of the beam refinement reference signal comprises setting one or more bit fields of a physical broadcast channel (PBCH) to indicate presence of the beam refinement reference signal.
12. The method of clause 11, wherein the one or more bit fields indicate resources of the beam refinement reference signal.
13. The method of clause 10, wherein scheduling the transmission of the beam refinement reference signal comprises including an indication of resources for the beam refinement reference signal in remaining minimum system information (RMSI) or other system information (OSI).
14. The method of any of clauses 10-13, wherein the beam refinement reference signal is applicable depending one or more of: frequency range, frequency band, subcarrier spacing, or paging radio network temporary identifier (P-RNTI).
15. The method of any of clauses 10-14, wherein the beam refinement reference signal uses a same sequence as a channel state information reference signal (CSI-RS).
16. The method of any of clauses 10-15, wherein scheduling the transmission of the beam refinement reference signal prior to the paging PDCCH monitoring occasion comprises indicating resources for the beam refinement reference signal relative to the PDCCH monitoring occasion.
17. An apparatus for wireless communication, comprising:
    a memory storing computer-executable instructions; and
    at least one processor coupled to the memory and configured to execute the computer-executable instructions to:
       receive at least one transmission indicating a beam refinement reference signal transmitted prior to a paging physical downlink control channel (PDCCH) monitoring occasion;
       receive the beam refinement reference signal prior to the paging PDCCH monitoring occasion based on the at least one transmission; and
       receive a downlink control information on the paging PDCCH monitoring occasion based on the beam refinement reference signal.
18. The apparatus of clause 17, wherein the at least one transmission indicating the beam refinement reference signal is a physical broadcast channel (PBCH) including one or more bit fields indicating presence of the beam refinement reference signal.
19. The apparatus of clause 18, wherein the one or more bit fields indicate resources of the beam refinement reference signal.
20. The apparatus of clause 17, wherein the at least one transmission is remaining minimum system information (RMSI) or other system information (OSI) indicating resources of the beam refinement reference signal.
21. The apparatus of any of clauses 17-20, wherein the beam refinement reference signal is applicable depending on one or more of: frequency range, frequency band, subcarrier spacing, or paging radio network temporary identifier (P-RNTI).

22. The apparatus of any of clauses 17-21, wherein the at least one processor is configured to refine a receive beam based on the beam refinement reference signal.
23. The apparatus of clause 22, wherein the at least one processor is configured to select a beam from a hierarchical beam structure based on the beam refinement reference signal.
24. The apparatus of clause 22, wherein the at least one processor is configured to adjust a weight of a calculated receive beam based on the beam refinement reference signal.
25. The apparatus of any of clauses 17-24, wherein the beam refinement reference signal uses a same sequence as a channel state information reference signal (CSI-RS).
26. An apparatus for wireless communication, comprising:
    a memory storing computer-executable instructions; and
    at least one processor coupled to the memory and configured to execute the computer-executable instructions to:
        schedule a transmission of a beam refinement reference signal prior to a paging physical downlink control channel (PDCCH) monitoring occasion;
        transmit the beam refinement reference signal; and
        transmit a paging downlink control information (DCI) on the paging PDCCH monitoring occasion subsequent to the beam refinement reference signal.
27. The apparatus of clause 26, wherein the at least one processor is configured to set one or more bit fields of a physical broadcast channel (PBCH) to indicate presence of the beam refinement reference signal.
28. The apparatus of clause 27, wherein the one or more bit fields indicate resources of the beam refinement reference signal.
29. The apparatus of clause 26, wherein the at least one processor is configured to include an indication of resources for the beam refinement reference signal in remaining minimum system information (RMSI) or other system information (OSI).
30. The apparatus of any of clauses 26-29, wherein the beam refinement reference signal is applicable depending one or more of: frequency range, frequency band, subcarrier spacing, or paging radio network temporary identifier (P-RNTI).
31. The apparatus of any of clauses 26-30, wherein the beam refinement reference signal uses a same sequence as a channel state information reference signal (CSI-RS).
32. The apparatus of any of clauses 26-31, wherein the at least one processor is configured to indicate resources for the beam refinement reference signal relative to the PDCCH monitoring occasion.
33. An apparatus for wireless communications at a UE, comprising:
    means for receiving at least one transmission indicating a beam refinement reference signal transmitted prior to a paging physical downlink control channel (PDCCH) monitoring occasion;
    means for receiving the beam refinement reference signal prior to the paging PDCCH monitoring occasion based on the at least one transmission; and
    means for receiving a downlink control information on the paging PDCCH monitoring occasion based on the beam refinement reference signal.
34. The apparatus of clause 33, wherein the at least one transmission indicating the beam refinement reference signal is a physical broadcast channel (PBCH) including one or more bit fields indicating presence of the beam refinement reference signal.
35. The apparatus of clause 34, wherein the one or more bit fields indicate resources of the beam refinement reference signal.
36. The apparatus of clause 33, wherein the at least one transmission is remaining minimum system information (RMSI) or other system information (OSI) indicating resources of the beam refinement reference signal.
37. The apparatus of any of clauses 33-36, wherein the beam refinement reference signal is applicable depending on one or more of: frequency range, frequency band, subcarrier spacing, or paging radio network temporary identifier (P-RNTI).
38. The apparatus of any of clauses 33-37, further comprising means for refining a receive beam based on the beam refinement reference signal.
39. The apparatus of clause 38, wherein the means for refining the receive beam is configured to select a beam from a hierarchical beam structure based on the beam refinement reference signal.
40. The apparatus of clause 38, wherein the means for refining the receive beam is configured to adjust a weight of a calculated receive beam based on the beam refinement reference signal.
41. The apparatus of any of clauses 33-40, wherein the beam refinement reference signal uses a same sequence as a channel state information reference signal (CSI-RS).
42. An apparatus for wireless communications at a base station, comprising:
    means for scheduling a transmission of a beam refinement reference signal prior to a paging physical downlink control channel (PDCCH) monitoring occasion;
    means for transmitting the beam refinement reference signal; and
    means for transmitting a paging downlink control information (DCI) on the paging PDCCH monitoring occasion subsequent to the beam refinement reference signal.
43. The apparatus of clause 42, wherein the means for scheduling the transmission of the beam refinement reference signal is configured to set one or more bit fields of a physical broadcast channel (PBCH) to indicate presence of the beam refinement reference signal.
44. The apparatus of clause 43, wherein the one or more bit fields indicate resources of the beam refinement reference signal.
45. The apparatus of clause 42, wherein the means for scheduling the transmission of the beam refinement reference signal is configured to include an indication of resources for the beam refinement reference signal in remaining minimum system information (RMSI) or other system information (OSI).
46. The apparatus of any of clauses 42-45, wherein the beam refinement reference signal is applicable depending one or more of: frequency range, frequency band, subcarrier spacing, or paging radio network temporary identifier (P-RNTI).
47. The apparatus of any of clauses 42-46, wherein the beam refinement reference signal uses a same sequence as a channel state information reference signal (CSI-RS).
48. The apparatus of any of clauses 42-47, wherein the means for scheduling the transmission of the beam refinement reference signal prior to the paging PDCCH monitoring occasion is configured to indicate resources for the beam refinement reference signal relative to the PDCCH monitoring occasion.
49. A non-transitory computer-readable medium storing computer executable code, the code when executed by a processor causes the processor to:

receive at least one transmission indicating a beam refinement reference signal transmitted prior to a paging physical downlink control channel (PDCCH) monitoring occasion;

receive the beam refinement reference signal prior to the paging PDCCH monitoring occasion based on the at least one transmission; and receive a downlink control information on the paging PDCCH monitoring occasion based on the beam refinement reference signal.

50. The non-transitory computer-readable medium of clause 49, wherein the at least one transmission indicating the beam refinement reference signal is a physical broadcast channel (PBCH) including one or more bit fields indicating presence of the beam refinement reference signal.

51. The non-transitory computer-readable medium of clause 50, wherein the one or more bit fields indicate resources of the beam refinement reference signal.

52. The non-transitory computer-readable medium of clause 49, wherein the at least one transmission is remaining minimum system information (RMSI) or other system information (OSI) indicating resources of the beam refinement reference signal.

53. The non-transitory computer-readable medium of any of clauses 49-52, wherein the beam refinement reference signal is applicable depending on one or more of: frequency range, frequency band, subcarrier spacing, or paging radio network temporary identifier (P-RNTI).

54. The non-transitory computer-readable medium of any of clauses 49-53, further comprising code to refine a receive beam based on the beam refinement reference signal.

55. The non-transitory computer-readable medium of clause 54, wherein the code to refine the receive beam comprises code to select a beam from a hierarchical beam structure based on the beam refinement reference signal.

56. The non-transitory computer-readable medium of clause 54, wherein the code to refine the receive beam includes code to adjust a weight of a calculated receive beam based on the beam refinement reference signal.

57. The non-transitory computer-readable medium of any of clauses 49-56, wherein the beam refinement reference signal uses a same sequence as a channel state information reference signal (CSI-RS).

58. A non-transitory computer-readable medium storing computer executable code, the code when executed by a processor causes the processor to:

schedule a transmission of a beam refinement reference signal prior to a paging physical downlink control channel (PDCCH) monitoring occasion;

transmit the beam refinement reference signal; and transmit a paging downlink control information (DCI) on the paging PDCCH monitoring occasion subsequent to the beam refinement reference signal.

59. The non-transitory computer-readable medium of clause 58, wherein the code to schedule the transmission of the beam refinement reference signal includes code to set one or more bit fields of a physical broadcast channel (PBCH) to indicate presence of the beam refinement reference signal.

60. The non-transitory computer-readable medium of clause 59, wherein the one or more bit fields indicate resources of the beam refinement reference signal.

61. The non-transitory computer-readable medium of clause 58, wherein the code to schedule the transmission of the beam refinement reference signal includes code to include an indication of resources for the beam refinement reference signal in remaining minimum system information (RMSI) or other system information (OSI).

62. The non-transitory computer-readable medium of any of clauses 58-61, wherein the beam refinement reference signal is applicable depending one or more of: frequency range, frequency band, subcarrier spacing, or paging radio network temporary identifier (P-RNTI).

63. The non-transitory computer-readable medium of any of clauses 58-62, wherein the beam refinement reference signal uses a same sequence as a channel state information reference signal (CSI-RS).

64. The non-transitory computer-readable medium of any of clauses 58-63, wherein the code to schedule the transmission of the beam refinement reference signal prior to the paging PDCCH monitoring occasion includes code to indicate resources for the beam refinement reference signal relative to the PDCCH monitoring occasion.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communications, comprising, at a UE:

receiving at least one transmission indicating a beam refinement reference signal transmitted prior to a paging physical downlink control channel (PDCCH) monitoring occasion;

receiving the beam refinement reference signal prior to the paging PDCCH monitoring occasion based on the at least one transmission; and receiving a downlink control information on the paging PDCCH monitoring occasion based on the beam refinement reference signal.

2. The method of claim 1, wherein the at least one transmission indicating the beam refinement reference signal is a physical broadcast channel (PBCH) including one or more bit fields indicating presence of the beam refinement reference signal.

3. The method of claim 2, wherein the one or more bit fields indicate resources of the beam refinement reference signal.

4. The method of claim 1, wherein the at least one transmission is remaining minimum system information (RMSI) or other system information (OSI) indicating resources of the beam refinement reference signal.

5. The method of claim 1, wherein the beam refinement reference signal is applicable depending on one or more of: frequency range, frequency band, subcarrier spacing, or paging radio network temporary identifier (P-RNTI).

6. The method of claim 1, further comprising refining a receive beam based on the beam refinement reference signal.

7. The method of claim 6, wherein refining the receive beam comprises selecting a beam from a hierarchical beam structure based on the beam refinement reference signal.

8. The method of claim 6, wherein refining the receive beam comprises adjusting a weight of a calculated receive beam based on the beam refinement reference signal.

9. The method of claim 1, wherein the beam refinement reference signal uses a same sequence as a channel state information reference signal (CSI-RS).

10. A method of wireless communications, comprising, at a base station:
scheduling a transmission of a beam refinement reference signal prior to a paging physical downlink control channel (PDCCH) monitoring occasion;
transmitting the beam refinement reference signal; and
transmitting a paging downlink control information (DCI) on the paging PDCCH monitoring occasion subsequent to the beam refinement reference signal.

11. The method of claim 10, wherein scheduling the transmission of the beam refinement reference signal comprises setting one or more bit fields of a physical broadcast channel (PBCH) to indicate presence of the beam refinement reference signal.

12. The method of claim 11, wherein the one or more bit fields indicate resources of the beam refinement reference signal.

13. The method of claim 10, wherein scheduling the transmission of the beam refinement reference signal comprises including an indication of resources for the beam refinement reference signal in remaining minimum system information (RMSI) or other system information (OSI).

14. The method of claim 10, wherein the beam refinement reference signal is applicable depending one or more of: frequency range, frequency band, subcarrier spacing, or paging radio network temporary identifier (P-RNTI).

15. The method of claim 10, wherein the beam refinement reference signal uses a same sequence as a channel state information reference signal (CSI-RS).

16. The method of claim 10, wherein scheduling the transmission of the beam refinement reference signal prior to the paging PDCCH monitoring occasion comprises indicating resources for the beam refinement reference signal relative to the PDCCH monitoring occasion.

17. An apparatus for wireless communication, comprising:
a memory storing computer-executable instructions; and
at least one processor coupled to the memory and configured to execute the computer-executable instructions to:
receive at least one transmission indicating a beam refinement reference signal transmitted prior to a paging physical downlink control channel (PDCCH) monitoring occasion;
receive the beam refinement reference signal prior to the paging PDCCH monitoring occasion based on the at least one transmission; and
receive a downlink control information on the paging PDCCH monitoring occasion based on the beam refinement reference signal.

18. The apparatus of claim 17, wherein the at least one transmission indicating the beam refinement reference signal is a physical broadcast channel (PBCH) including one or more bit fields indicating presence of the beam refinement reference signal.

19. The apparatus of claim 18, wherein the one or more bit fields indicate resources of the beam refinement reference signal.

20. The apparatus of claim 17, wherein the at least one transmission is remaining minimum system information (RMSI) or other system information (OSI) indicating resources of the beam refinement reference signal.

21. The apparatus of claim 17, wherein the beam refinement reference signal is applicable depending on one or more of: frequency range, frequency band, subcarrier spacing, or paging radio network temporary identifier (P-RNTI).

22. The apparatus of claim 17, wherein the at least one processor is configured to refine a receive beam based on the beam refinement reference signal.

23. The apparatus of claim 22, wherein the at least one processor is configured to select a beam from a hierarchical beam structure based on the beam refinement reference signal.

24. The apparatus of claim 22, wherein the at least one processor is configured to adjust a weight of a calculated receive beam based on the beam refinement reference signal.

25. The apparatus of claim 17, wherein the beam refinement reference signal uses a same sequence as a channel state information reference signal (CSI-RS).

26. An apparatus for wireless communication, comprising:
a memory storing computer-executable instructions; and
at least one processor coupled to the memory and configured to execute the computer-executable instructions to:
schedule a transmission of a beam refinement reference signal prior to a paging physical downlink control channel (PDCCH) monitoring occasion;
transmit the beam refinement reference signal; and
transmit a paging downlink control information (DCI) on the paging PDCCH monitoring occasion subsequent to the beam refinement reference signal.

27. The apparatus of claim 26, wherein the at least one processor is configured to set one or more bit fields of a physical broadcast channel (PBCH) to indicate presence of the beam refinement reference signal.

28. The apparatus of claim 26, wherein the at least one processor is configured to include an indication of resources for the beam refinement reference signal in remaining minimum system information (RMSI) or other system information (OSI).

29. The apparatus of claim 26, wherein the beam refinement reference signal is applicable depending one or more of: frequency range, frequency band, subcarrier spacing, or paging radio network temporary identifier (P-RNTI).

30. The apparatus of claim 26, wherein the beam refinement reference signal uses a same sequence as a channel state information reference signal (CSI-RS).

* * * * *